July 10, 1962   F. H. ESCH   3,043,644
TENSION CORD SUPPORT ARRANGEMENT FOR
SATELLITE INTERNAL STRUCTURE
Filed Feb. 2, 1961   2 Sheets-Sheet 1

FRED H. ESCH
INVENTOR

BY  W. O. Quesenberry
    Claude Funkhouser
    ATTORNEYS

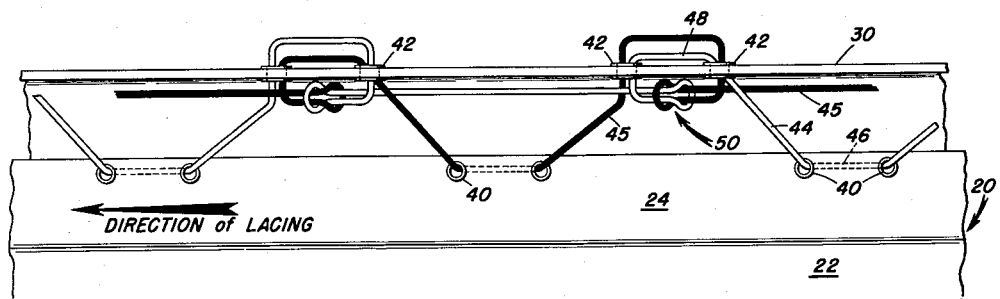
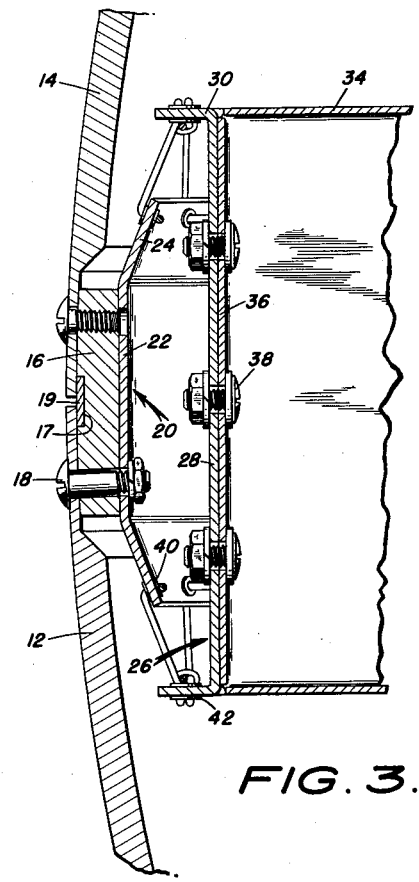
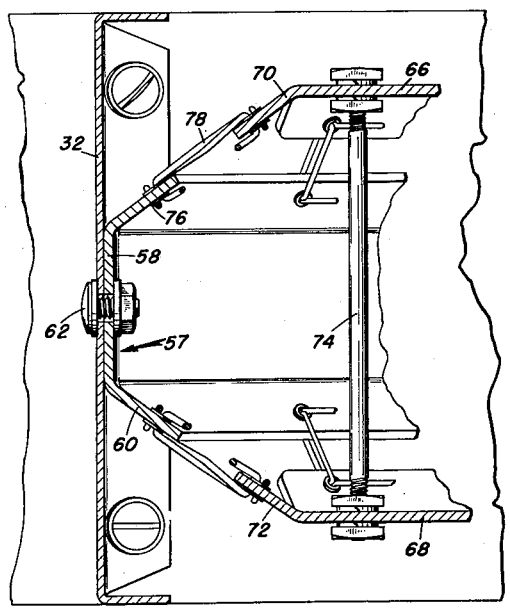

United States Patent Office 3,043,644
Patented July 10, 1962

3,043,644
TENSION CORD SUPPORT ARRANGEMENT FOR
SATELLITE INTERNAL STRUCTURE
Fred H. Esch, Silver Spring, Md., assignor to the United
States of America as represented by the Secretary of
the Navy
Filed Feb. 2, 1961, Ser. No. 86,833
5 Claims. (Cl. 312—352)

This invention relates generally to supports; more particularly, it relates to means for supporting an instrument mounting structure within a satellite.

Many satellites are placed in orbit to gather scientific data and to transmit the same back to a receiving station upon command. As the instruments provided within a satellite for such purposes are often very sensitive to excessive heat and to temperature changes, it is desirable to mount them in an insulated manner. Radiation shields have been provided which effectively shield the instruments from radiated heat, but this does not prevent them from becoming heated due to conduction. In addition to the problem of maintaining a suitable temperature within a satellite, it is desirable to reduce the vibration and shock forces to which the instruments therein are subjected.

Accordingly, it is an object of the present invention to thermally isolate and securely mount instruments within a satellite.

Another object of the present invention is to mount instruments within a satellite so that they are substantially isolated from vibration.

A further object of the invention is to isolate instruments within a satellite from shock forces exerted thereon.

Other objects and many of the attendant advantages of this invention will be readily appreciated as the same becomes better understood by reference to the following detailed description when considered in connection with the accompanying drawings, wherein:

FIG. 3 is an enlarged detail section showing the mounting structure fastened to the outer shell of a satellite;

FIG. 4 is an enlarged detail section on line 4—4 of FIG. 2 showing an oscillator container fastened to a compartment rib; and FIG. 5 is a detail side elevation showing a method of lacing together inner and outer supporting rings.

The invention generally comprises an instrument mounting structure fastened to the inner periphery of a satellite by nylon lacing. The mounting structure is spaced from the satellite outer shell to substantially eliminate the conduction of heat and to attenuate the vibration and shock forces received by said structure. Certain heat sensitive instruments carried by the mounting structure may be further isolated by spacing them from said structure by nylon lacing.

Figure 2:
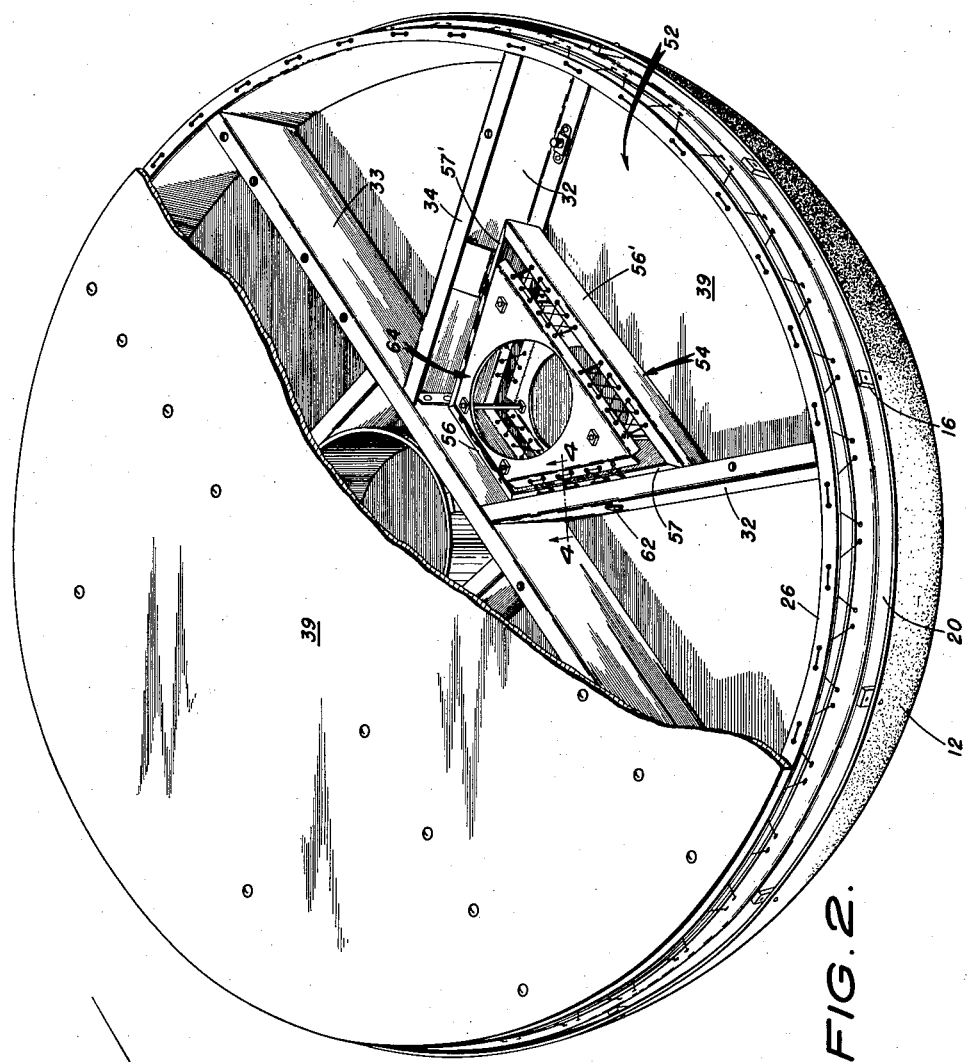
FIG. 2 is a perspective view of the instrument mounting structure shown secured in a spherical satellite, the top hemisphere of which has been omitted for purposes of clarity.
Figure 1:
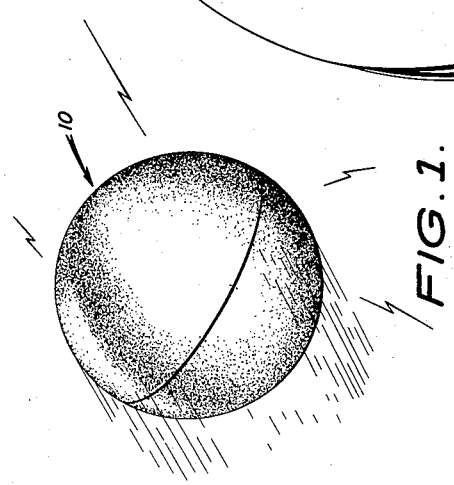
FIG. 1 is a view of a satellite in which the instrument mounting structure of the present invention may be embodied.

Referring to FIGS. 1–3, a spherical satellite indicated at 10 is provided with an outer casing or shell comprised of two identical hemispheres 12 and 14. Each hemisphere is fastened at spaced intervals about its circumference to a plurality of blocks 16 by suitable fastening means such as bolts 18. The circumferential edges of the hemispheres 12 and 14 extend over the outer surfaces of the blocks 16 to about the mid-points thereof so that the hemispheres are closely spaced to form a substantially continuous spherical surface. The outer surfaces of blocks 16 are centrally provided with grooves 17 parallel to the edges of the hemispheres, and a sealing ring 19 is fitted in said grooves to seal the space between the circumferential edges of the hemispheres. An annular support ring 20, having a central web 22 and inwardly inclined flanges 24, is secured to the inner surfaces of blocks 16 by any suitable fastening means, such as by welding or riveting the blocks to the web. The bolts 18 extend through properly aligned openings in the web 22 of ring 20 of the outer shell fastening.

An annular attachment ring 26 of lesser diameter than support ring 20 is comprised of a web 28 and outwardly directed flanges 30. A plurality of radially extending ribs 32 having edge flanges 34 and end flanges 36, are attached to ring 26 to form an instrument mounting structure. The outer ends of the ribs 32 are fastened to the attachment ring 26 by securing the end flanges 36 of said ribs to the web 28 of said ring by bolts 38. The ribs 32 have their corresponding inner ends secured to a chordally extending rib 33, which rib may be fastened to the attachment ring 26 in the same manner as the ribs 32. The attachment ring 26 may be provided with any desired combination or pattern of ribs to form a plurality of compartments so that any instruments desired to be packaged within a satellite may be securely mounted therein. As shown in FIG. 2, radiation shields in the form of disks 39 may be bolted to the edge flanges of the ribs 32 and 33 to cover each side of the instrument mounting structure.

The inwardly directed flanges 24 of support ring 20 are provided with a plurality of circumferentially spaced eyelets 40 arranged in any suitable pattern. The eyelets are shown, by way of example only, as being arranged in closely spaced pairs with relatively large spaces between each pair. Similarly, the outwardly directed flanges of attachment ring 26 are provided with a plurality of circumferentially spaced eyelets 42 arranged in the same pattern as eyelets 40. The support ring and attachment ring are so oriented that each pair of eyelets on one ring is positioned opposite a large space separating a pair of eyelets on the other ring. Nylon cords are provided to securely lace the adjacent edge flanges of the support and attachment rings, and to maintain said rings in spaced apart condition. Any suitable method of lacing may be used but it should be such that if one portion of the lacing should break, the entire lacing would not become slack and thus fail to support the attachment ring.

Since the lacings of both flanges of the rings are identical, the lacing of only one pair of adjacent flanges will be described. Referring to FIGS. 3 and 5, which show one possible method of lacing, it is seen that two nylon cords 44 and 45 are provided for lacing each pair of adjacent flanges 24 and 30. Beginning at the right as shown in FIG. 5 and working toward the left, in the direction of the arrow, cord 44 is laced through a pair of eyelets 40 in flange 24 such that the portion 46 of cord 44 connecting the eyelets 40 lies on the inner face of said flange. Cord 44 then extends to eyelets 42 of flange 30, where the portion 48 of said cord connecting said eyelets lies on the upper face of said flange. Directly opposite the portion 48 on the lower face of flange 30, cord 44 and cord 45 are tied in a square knot as indicated at 50, and the cord 45 then passes from said knot through the eyelets 42 of flange 30 on the upper face thereof adjacent the portion 48 of cord 44. The cord 45 then passes through the next pair of eyelets in flange 24 and along the inner face of said flange to the next pair of eyelets 42 in flange 30 where another knot is tied with cord 44. The entire peripheries of the flanges 24 and 30 are thus laced to provide a secure tension cord support means for the attachment ring. The instruments which may be mounted in the compartments formed by the ribs 32 and 33 are effectively thermally isolated from the outer shell of the satellite because of the non-conductivity of the nylon lacings, which are the only supporting means connected to ring 20. The lacings additionally provide the function of absorbing vibrations and shock forces transmitted through the outer shell of the satellite to effectively attenuate said forces.

Although heat conducted to the instrument mounting structure is greatly reduced by the tension cord mounting above described, a very small amount does reach said structure by radiation. The slight change in temperature which would occur as a result of this heat may have a deleterious effect on a sensitive instrument such as an oscillator. It may therefore be desirable to further isolate such oscillator by supporting its container with nylon lacings within a compartment of the instrument mounting structure.

Referring now to FIGS. 2 and 4, a compartment 52 is formed by the radial ribs 32, chordal rib 33 and attachment ring 26. An oscillator supporting frame 54, mounted within compartment 52 is of polygonal shape and is comprised of inner and outer support plates 56 and 56' and side support plates 57 and 57'. The frame 54 is shaped to conform to the general configuration of the compartment 52. The plates 56, 56', 57 and 57' each consist of a web 58 and inwardly inclined side flanges 60, and are secured to the ribs 32 and 33 by any suitable fastening means, such as bolts 62 passing through the webs of said ribs and said support plates. An oscillator mount or container is indicated at 64 and is comprised of top and bottom plates 66 and 68, the perimeter of each having substantially the same outline as the oscillator frame 54. The top plate 66 has a downwardly inclined flange 70 about the entire perimeter thereof and the bottom plate 68 has an upwardly inclined flange 72 about its entire perimeter. The plates 66 and 68 are held rigidly spaced from each other by spacer rods 74 threadedly attached to both plates near each corner thereof, and an opening is provided centrally of each said top and bottom plate to receive an oscillator assembly. As best seen in FIG. 4, the plates 66 and 68 are positioned, respectively, in horizontal planes above and below the upper and lower perimeters of the support plates of the frame 54, and inside the vertical planes of said support plates, so that the flanges 70 and 72 will lie in the same inclined planes as the side flanges 60 of said support plates.

The flanges 60, 70, 72 are provided with eyelets 76 spaced about the perimeters thereof in any desired manner. Nylon cord 78 is laced through opposing eyelets to securely mount and isolate the top and bottom plates from the side support plates. The arrangement shown in FIG. 2, by way of example only, comprises a group of evenly spaced eyelets in each of the flanges 60 of inner plate 56 and side plates 57 and 57' of frame 54. The adjacent flanges 70 and 72 of top and bottom plates 66 and 68 are provided with a like number of evenly spaced eyelets. The flanges 60 of outer plate 56' and the adjacent flanges 70 and 72 of top and bottom plates 66 and 68 are each provided with two spaced groups of evenly spaced eyelets. A single nylon cord 78 is used to interlace each group of eyelets of opposed flanges in any desired pattern. Only a small load is transmitted to the cords 78 since the cords 44 and 45 supporting the attaching ring 26 receive most of the load. Thus, a very high safety factor exists in the oscillator support arrangement, making it highly unlikely that any of the cords 78 will break. If one of the cords 78 should happen to fail, however, the strands in the other eyelet groups will be capable of taking up the increased load.

In view of the foregoing disclosure, it should now be appreciated that the present invention provides a simple, yet highly effective means for mounting instruments within a satellite so that they are substantially free from heat conduction, vibration, and shock. It should be understood that said mounting means may be adapted for use with any shape of satellite or instrument mounting structure and that any desired compartment design may be used. It should further be understood that the present invention is not limited to nylon lacings or to the specific lacing patterns disclosed herein.

Obviously many other modifications and variations of the present invention are possible in the light of the above teachings. It should therefore be understood that within the scope of the appended claims the invention may be practiced otherwise than as specifically described.

What is claimed is:

1. In an instrument carrying satellite having an outer shell, an instrument mounting structure in the shell, said mounting structure including a plurality of ribs forming a compartment, a mounting frame in said compartment comprising a plurality of support plates fastened to said ribs, an instrument container positioned within said mounting frame, said instrument container including parallel spaced plates the edges of which are parallel to the support plates of said mounting frame, said parallel plates having instrument receiving means therein, a plurality of eyelets spaced about the perimeters of said parallel plates and said support plates, and cord means interlacing said eyelets to support said instrument container within said mounting frame.

2. In an instrument carrying satellite as recited in claim 1, further including support means on the inner periphery of said outer shell, a plurality of eyelets spaced about said support means, a plurality of eyelets spaced about the outer periphery of said mounting structure, and cord means interlacing the eyelets of said mounting structure and said support means to support said instrument mounting structure within the outer shell of said satellite.

3. In an instrument carrying satellite having an outer shell, a support ring coextensively attached to an inner surface of said shell and having a plurality of cord receiving means, an instrument mounting structure concentrically disposed within and having a greater width than said support ring and having substantially the same diameter as said ring, said structure having thereon a second plurality of cord receiving means, a support means for said structure consisting of a first cord and a second cord, said first cord engaging alternate cord receiving means on said support ring and consecutive cord receiving means on said structure, said second cord similarly engaging the remaining cord receiving means on said support ring and the same cord receiving means on said structure as said first cord, and means attaching said first cord to said second cord at each cord receiving means on said structure, whereby the support means will not fail even though a portion thereof should break.

4. In an instrument carrying satellite as recited in claim 3, wherein said instrument mounting structure has a plurality of compartments, at least one of said compartments having a supporting frame located therein, said frame including a plurality of supporting plates having inclined flanges with a plurality of grouped cord receiving means located thereon, an instrument container disposed within said area defined by said supporting frame and having inclined flanges thereon positioned to confront said inclined flanges on said plates, said inclined flanges on said container having thereon a second plurality of correspondingly grouped cord receiving means, and a support means for said container consisting of a plurality of cords, one of said cords interlacing corresponding groups of cord receiving means on said confronting flanges, whereby the support means will provide the function of absorbing vibrations, shock forces and thermal energy transmitted through the outer shell of the satellite to effectively attenuate said forces.

5. In an instrument carrying satellite as recited in claim 3, wherein said cord receiving means on said instrument mounting structure consists of pairs of eyelets spaced along the outer periphery of opposite ends of said structure, said cord receiving means on said support ring consists of pairs of eyelets spaced along the outer periphery of opposite ends of said ring, and said cord is comprised of a resilient material such as nylon, whereby the instrument mounting structure is thermally isolated from the shell.

References Cited in the file of this patent

UNITED STATES PATENTS

| | | |
|---|---|---|
| 655,017 | Sansone | July 31, 1900 |
| 2,454,616 | Schultz | Nov. 23, 1948 |

FOREIGN PATENTS

| | | |
|---|---|---|
| 767,171 | France | May 1, 1934 |
| 492,508 | Great Britain | Sept. 21, 1938 |
| 500,562 | Great Britain | Feb. 13, 1939 |
| 1,002,237 | Germany | Feb. 7, 1957 |